Sept. 11, 1973   C. A. HEYNE   3,758,286
GLASS FEEDER SHEAR MECHANISM
Filed April 30, 1971   3 Sheets-Sheet 1

INVENTOR.
CLARENCE A. HEYNE

BY
ATTORNEYS

INVENTOR.
CLARENCE A. HEYNE
ATTORNEYS

INVENTOR.
CLARENCE A. HEYN
BY
ATTORNEYS

United States Patent Office 3,758,286
Patented Sept. 11, 1973

3,758,286
GLASS FEEDER SHEAR MECHANISM
Clarence A. Heyne, Toledo, Ohio, assignor to
Owens-Illinois, Inc.
Filed Apr. 30, 1971, Ser. No. 138,887
Int. Cl. C03b 5/38
U.S. Cl. 65—334                                    15 Claims

ABSTRACT OF THE DISCLOSURE

In preferred embodiments of the invention illustrated herein there is shown method and apparatus for shearing a plurality of gobs aligned in a row and issuing from a molten glass feeder. A pair of opposed shear carriages are provided which are movable toward and away from each other between open and shearing positions with respect to a row of a gobs. A pair of opposing gob cutting surfaces for each gob to be severed are mounted on the opposed shear carriages. A lever is provided for each shear carriage having one end pivotally connected to its carriage and a portion remote from the carriage end pivotally supported on a frame structure. Each lever is operable to pivot the carriage toward and away from a gob shearing position. Means are connected to each of the shear carriages for pivoting the shear carriages on their levers to translate the arcuate motion imparted to the carrier by the levers to substantially linear motion enabling the gob cutting surfaces to substantially simultaneously engage and sever the plurality of gobs. The motion translating means preferably includes a steering link having one end pivotally connected to the shear carriage a predetermined distance from the lever connection to the carriage, and a means for pivotally supporting the other end of the steering link a fixed distance from the pivotally supported other end of the lever. Novel blade structures, alignment and cooling features are also shown.

BACKGROUND OF THE INVENTION

This invention relates generally to the manufacture of glass and more particularly to an improvement in means for actuating shear mechanisms for use in conjunction with glass feeders of the type used to form suspended glass mold charges. The method and apparatus of the present invention may be employed at the outlet of the glass furnace forehearth in the manufacture of glass articles. The glass is fed from the furnace forehearth through a feeder orifice, or orifices in the case of multiple gob feeding, each orifice directing the molten glass in a generally vertical stream from the furnace outlet. Gob cutting shears are employed to periodically sever the lowermost portion of this flowing stream into a discrete glass gob of predetermined volume. After the gob has been severed it is permitted to fall or slide down a suitable feed chute into a glass forming mold or other glass forming device.

The cutting of gobs of glass is a critical operation since minor defects or irregularities caused as the gob is cut may result in a defectively formed glass article. For example, a surface defect is sometimes present upon completely formed glass articles in the form of a long thin scar. This defect is called a shear mark as it has been found to result from improper gob cutting and particularly from a misalignment or improper engagement of the shear blades. These marks are objectionable and frequently result in unacceptable glassware. They are particularly troublesome since the defect or misalignment in the shears which causes the shear marks may injure a significant number of articles before the trouble is detected and corrected.

Even the slightest misalignment of the shearing edges has been found to be capable of forming objectionable shear marks. This misalignment, which may be caused by an initial misalignment in setting or by unequal wear or improper blade movement or a variety of other reasons, has been found to cause shear marks to such an extent that normal glass flow action in the gob is insufficient to remove the mark. The result is the retention of the mark throughout the glass forming operation so that a mark of significant and objectionable size is present on the finished article marking it unacceptable.

Shears for cutting discrete gobs of glass issuing from molten glass feeders have been either pivoted or straight line types. In pivoted shear structures of the past, wherein the shear blades are mounted on swinging arms, an undesirable thrust has sometimes been imparted to the sheared gob, shears scars are likely to appear on the gobs, and satisfactory multiple gobbing is made extremely difficult. That is, the gob furthest out from the shear arm pivot is contacted by the shear blades after the inner gob or gobs and it thus has a longer time to flow through the feeder orifices. This normally produces gobs of different weight and length and in the past has been corrected by reaming one or more of the inner gob orifices.

Straight line shearing overcomes most of the aforesaid disadvantages, and it is particularly adapted to multiple gob shearing. In straight line shearing, the shear blades advance toward the opposing gobs from opposite directions. Such straight line shear mechanisms are either mechanically actuated or actuated by a combination of fluid motor and mechanical systems. However, such straight line shear mechanisms occupy an undesirably large amount of space adjacent the feeder orifices, are generally more expensive than pivoted shear structures, and have more maintenance problems since the devices are generally more complicated. Moreover, it is desirable to be able to change the orifice rings which direct the glass from the forehearth and forms the molten streams, after a predetermined wear period has passed. In order to replace orifice rings the straight line mechanism must be either partially disassembled or moved out of the way, the latter case thus requiring twice the space of the already bulky initial space occupied.

Accordingly, it is an object of the present invention to provide a new and improved method and apparatus for glass gob cutting.

It is another object of the present invention to provide glass cutting mechanism which may be pivoted out of the way to enable the orifice rings to be easily replaced or changed.

It is a still further object of the present invention to provide new and improved mechanism for pivoting shear carriages into and out of gob severing positions while maintaining the shear carriage and thus the cutting blades or edges in a substantially straight line approach for contact and severing of the gobs.

A yet further object of the invention is to provide a gob shearing mechanism having a drive which provides high speed shearing and which further has internal cooling for the gob shears to more accurately control the temperature of the shears while reducing area pollution that resulted from previous cooling methods.

SUMMARY OF THE INVENTION

There is described herein a method and apparatus for carrying out the method to attain the above objects. Shear carriages carrying gob shearing blade means are positioned in opposition to each other. Each carrier is pivotally supported on levers which are pivotal away from and toward each other to move the shearing blade means into and out of gob shearing position. The carriages are pivoted on their respective levers as the carriages are moved toward each other so that the shearing blade means approach each other in a substantially linear direction during the gob contacting and shearing portion of their movement.

A plurality of shearing blade cutting surfaces may be mounted on each carriage in registration with the shearing blade cutting surfaces on the other carriage and aligned in a row transverse to the linear direction of movement of the carriage enabling the simultaneous contacting and severing of the like plurality of gobs issuing from the molten glass feeder. The gob shearing blade means may be formed with internal passages and a cooling fluid may be circulated through the internal passages.

The carriage levers may be mounted on a first frame structure and the first frame structure may be pivotally mounted on a second frame structure enabling the pivoting of the entire assembly out of the way to change orifice rings in the molten glass feeder.

One end of a pair of drive links may be connected to the ends of the levers remote from the carriage ends and extended toward each other. A drive means, such as a reciprocating piston rod of a fluid cylinder motor may be secured to the other ends of the drive links. The reciprocation of the rod along a path transverse to the linear direction of movement of the carriages drives the levers through a toggle linkage including the drive links, and causes the levers to pivot toward and away from each other and provides an increased shearing speed.

Other objects, advantages and feature of this invention will become apparent when the following description is taken in conjunction with the accompanying drawings, in which.

DESCRIPTION OF THE PREFERRED EMBODIMENTS

Figure 1:
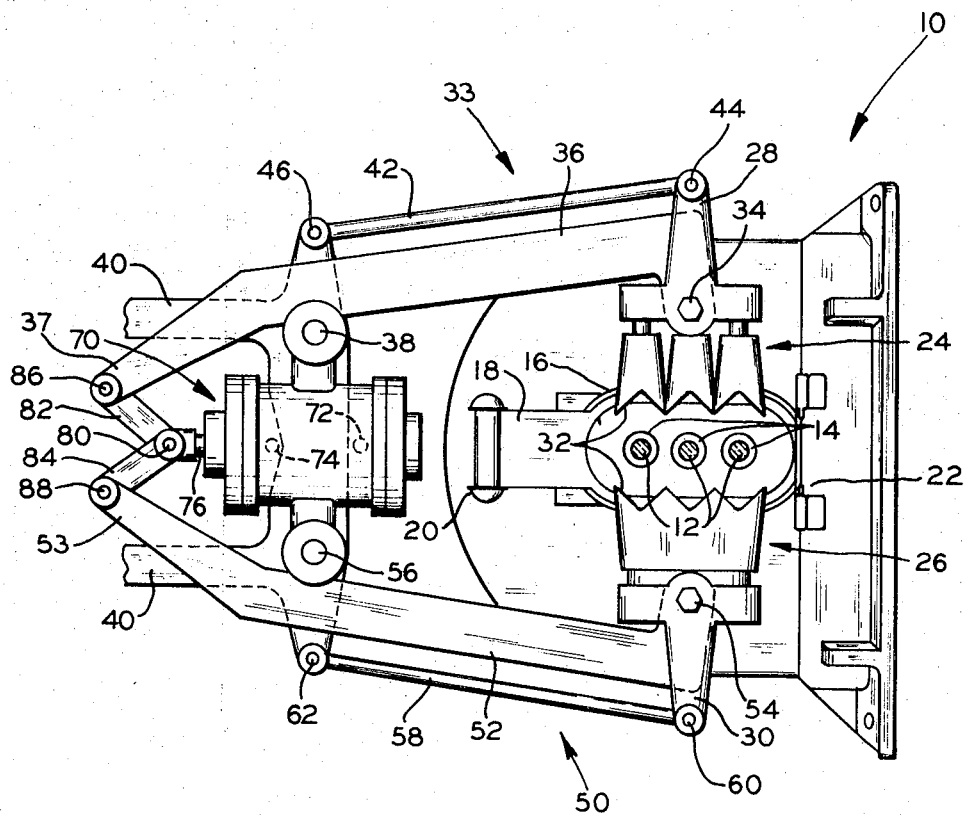
FIG. 1 is a partially diagrammatic view looking up from beneath at an apparatus embodying the teachings of this invention as employed with a multiple gob feeder arrangement.

FIG. 1 of the drawings illustrates the forehearth 10 of a glass furnace from which molten glass streams 12 are being delivered downwardly from feeder orifices 14 formed in a feeder orifice ring member 16. The orifice ring 16 is supported against an opening in the forehearth 10 by a plate 18 which has one end hinged at 20 to enable the plate 18 to be pivoted away from the forehearth to permit orifice ring replacement. The other end of the plate 18 is latched in the feeding position by the latch mechanism 22.

Figure 2:
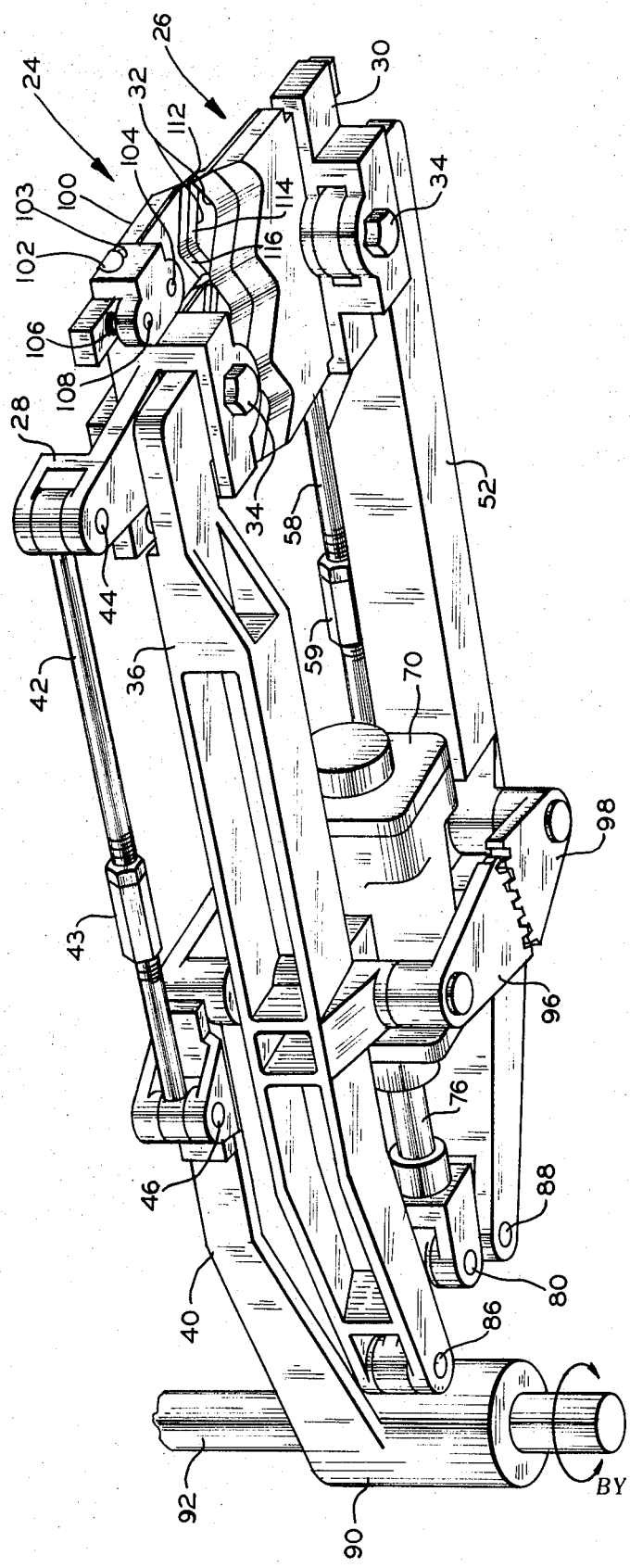
FIG. 2 is a view in perspective of the apparatus illustrated in FIG. 1.

Referring now to both the bottom view in FIG. 1 and the perspective of FIG. 2 it can be seen that opposed shearing means 24, 26 are mounted on a pair of opposed shear carriages 28, 30. The shearing means 24, 26 provide a plurality of opposed pairs of V-shaped cutting edges 32. The cutting edges 32 may be formed on a single blade means as is illustrated at 26, or the cutting edges 32 may be formed on individual blade means for each gob to be cut as illustrated at 24.

A pair of linkage systems generally indicated at 33 and 50 are utilized to move the pair of opposed shear carriages 28, 30 toward and away from each other between open and shearing positions with respect to the row of gobs 12.

The first linkage system 33 includes the elongated shear carriage 28 as a link. A second link 36 acts as a lever and is pivotally connected at one end at 34 to the carriage 28 and is pivotally connected at the other end at 38 to the frame 40. A steering link 42 is pivotally connected at 44 to the carriage 28, the pivotal connection 44 being spaced from the pivotal connection 34 a predetermined distance, and is pivotally connected at its other end at 46 to the frame 40. The pivotal connection 46 supports that end of the steering link 42 a fixed distance on the frame 40 from the pivotal connection 38 of the lever 36. Thus the frame portion between the pivotal connections 38, 46 serves as a fixed link in the linkage system 33.

In the linkage system 50 the elongated carrier 30 serves as a first link and is pivotally connected at 54 to a lever 52. The lever 52 is pivotally supported at 56 on the frame 40. A steering link 58 has one end pivotally connected at 60 to the carrier 30 at a predetermined distance from the pivotal connection 54, and has its other end pivotally supported on the frame 40 at 62. Again, the pivotal connection 62 is spaced a fixed distance from the pivotal connection 56 permitting that portion of the frame 40 therebetween to serve as a fixed link in the linkage system 50.

The levers 36, 52 have portions 37, 53 extending past the respective pivot points 38, 56 and inclined inwardly toward the center line of the row of gobs 12. A fluid cylinder driving means is generally indicated at 70 and includes a piston for reciprocating a piston rod 76 upon the admission and exhaust of fluid under pressure through ports 72, 74. The piston rod 76 is pivotally connected by a clevis arrangement 80 to one end of each of the drive links 82, 84. The other end of the drive links 82, 84 are pivotally connected to the lever extensions 37, 53 at 86, 88, respectively.

Referring now particularly to FIG. 2, it may be seen that steering links 42, 58 may have link length adjustment means 43, 59 included therein to change the stroke of the linkage system when different carriages, blade sizes, or other parameters of the system are varied.

It will also be noted in FIG. 2 that the frame 40 has has a frame portion 90 which is journaled on a frame post 92. Suitable means known in the art may be utilized for locking the journaled frame portion 90 in a gob shearing position, and for selectively releasing the locking means to pivot the entire gob shearing assembly out of the way to enable replacement of the orifice ring 16 as discussed hereinbefore.

Gear segment means 96, 98 are also shown in FIG. 2 and are fixedly secured to levers 36, 52, respectively, and meshed with each other to insure the synchronization and coaction of the linkage systems to properly sever the gobs 12.

As shown in FIG. 2 the individual shear blade 100 of the set of blades indicated generally at 24, has transversely extending shaft means 102 journally supported on the carriage 28 at 103. A stop pin 104 extends upwardly through the carriage 28 to contact the underside of blade 100 on the gob side of shaft 102. The stop pin 104 may be adjustable in height to permit alignment of the blade 100 with the cutting edges of the shearing means 26. A spring or other biasing means 106 is placed under compression between carriage 28 and the underside of blade 100 on the side of the blade opposite the stop pin 104. The spring 106 yieldingly biases the blade 100 into an aligned position to regulate the pressure applied between the cutting surfaces of the shearing means 24, 26. A centering retainer pin 108 extends up through the carriage 28 to center and retain the spring 106 and may be utilized for adjusting the bias exerted by the springs 106 in a manner well known in the art.

The remainder of the top blades 100 may be similarly mounted on the carriage 28. As noted hereinbefore the shearing means 26 may have a plurality of cutting edges 32 formed on a single member. However, the use of individual shear blades for the bottom shearing means 26 is within the purview of this invention.

Each cutting edge 32 on the blade 100 or the shearing means 26 may be formed with an initial slight flare 112 away from the cooperating cutting edge of the blade opposed thereto, enabling an initial sliding engagement since the blades 100 are yieldingly biased. A horizontal severing portion 114 meshes with an opposing horizontal severing portion on the cooperating blade. A step 116 is formed adjacent the cutting edge and is inclined away from the horizontal severing portion and from the other blade to reduce the adherence of the glass to the blade or the cutting edge.

Each of the linkage systems 33, 50 function to move the carriages 28, 30 in a substantially linear direction toward the opposing carriage during the gob contacting and shearing portion of carriage movement. Each linkage system includes four links pivotally connected at their ends to define a four sided figure, the carriage forming a first of the links and having second and third links pivotally connected thereto. In FIGS. 1 and 2 the fourth link is fixed and is pivotally connected at its ends to the second and third links. In the system described in FIGS. 1 and 2 and in the alternative system to be described with respect to FIG. 3, the fourth links of both systems are fixedly supported by at least one of its pivotal connections to the second and third links.

The fluid cylinder 70, the driving links 82, 84 and the lever extensions 37, 53 constitute means for reciprocally driving one of the second and third links toward and away from one of the second and third links of the other system, to move the carriage between the open and the shearing positions. The connection of the fluid cylinder 70 to the frame 40, the driving links 82, 84, and the lever extensions 37, 53, pivotally supported on the frame 40, constitute a toggle linkage system for driving each of the carriages 28, 30. This enables a relatively short stroke of the piston rod 76 to impart a high shearing speed to the carriages and thus the shearing means 24, 26.

As the levers 36, 52 are moved toward each other their pivotal connections 34, 54 define arcuate paths. However, the pivoting of the steering links 42, 58 about their pivot points 46, 62 changes the arcuate movement imparted by the levers 36, 52 to the carriages 28, 30 to a substantially straight or linear direction through the gob contacting and severing portion of the movement of the carriages toward each other. Thus, all of the pairs of cutting edges 32 are able to contact the gobs simultaneously and in direct opposition to each other, avoiding the problems associated with pivot type shearing means described hereinbefore.

By fixing the link between pivot points 38, 46, and 56, 62 the levers 36, 42 and 52, 58 can only oscillate providing a rocker mechanism which imparts a straight line motion to the carriages 28, 30 which are acting as links between the respective levers of their linkage systems.

Operation of the toggle linkage as defined to accomplish severing of a single set of gobs 12 requires that the fluid cylinder 70 be operated in only one direction. That is, assuming the piston rod 76 to be in the retracted position shown in FIG. 1, the carriages 28 and 30 carrying the shearing means 24 and 26 will be separated. As the piston rod 76 begins to extend, the carriages 28 and 30 will be moved toward one another with the eventual result of the gobs 12 being sheared by the shearing means 24 and 26. As the extension of the piston rod 76 continues, however, the carriages will be moved away from one another, reaching their starting or fully open position as shown in FIG. 1 when the piston rod 76 reaches its maximum extension. Thus, to sever the next set of gobs 12, the piston rod 76 is retracted to the position shown in FIG. 1, the path of motion of the carriages 28 and 30 and the shearing means 24 and 26 being identical on this return stroke to that taken on the extension stroke. This feature of the toggle linkage imparts additional speed to the shearing operation since a full cycle (extension and retraction) of the fluid cylinder 70 is not required to sever a set of gobs 12; gobs 12 are severed on both extension and retraction of the piston rod 76.

Not only does the toggle linkage described provide a high speed shearing, the particular linkage shown enables the use of a single fluid cylinder or other reciprocating driving means. The use of an air cylinder is preferable since no pollutant leaks will occur and the glass gob shearing and glass forming operation area will remain clean avoiding contamination of the products being manufactured.

Figure 3:
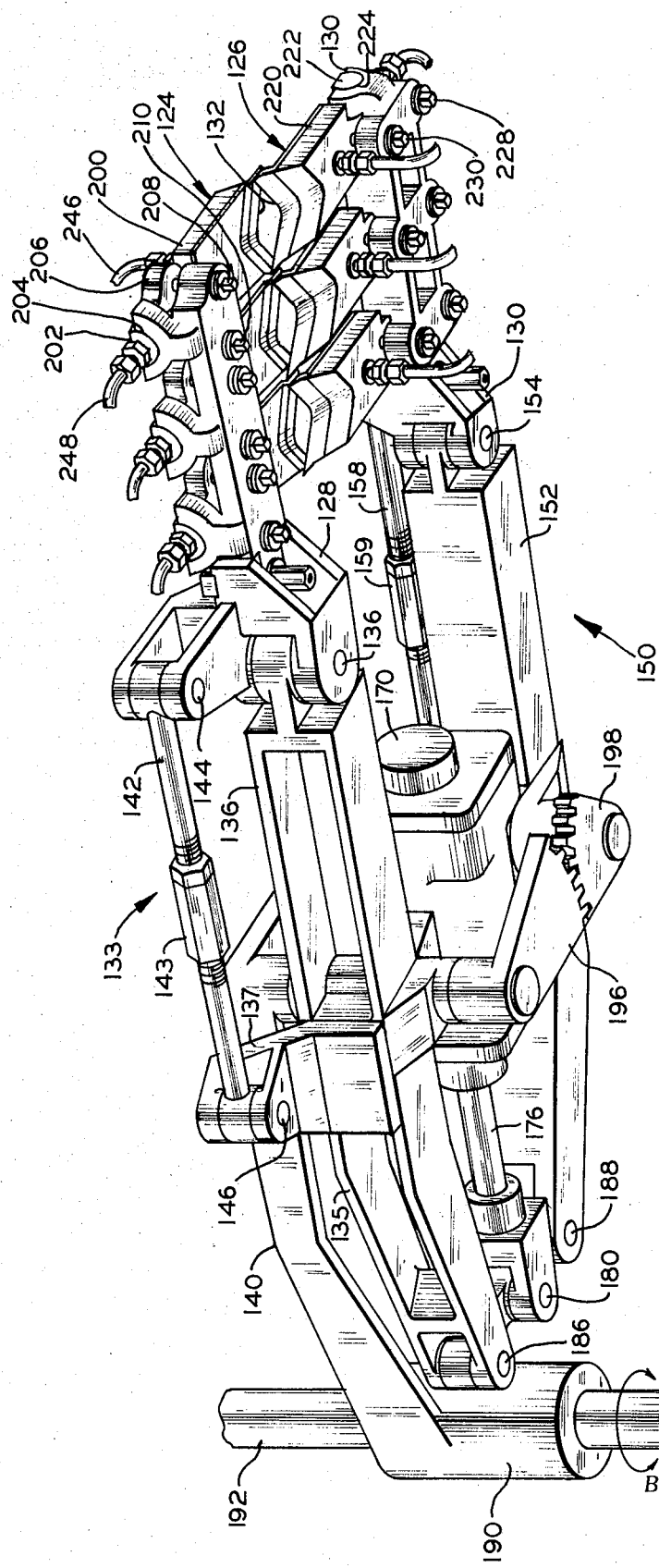
FIG. 3 is a view in perspective of a second embodiment of the teachings of this invention.

Referring now to FIG. 3 there is illustrated opposed shearing means 124, 126 mounted on opposed shear carriages 128, 130. Opposed pairs of cutting edges 132 are formed on the shearing means 124, 126.

A first linkage system 133 is shown in which the carriage 128 forms a first link, the carriage 128 being pivotally connected at 134 to a lever 136. The other end of the lever 136 is pivotally connected to the frame 140 at 146. The lever 136 has an extension 135 which is pivotally connected at 186 to a drive link to form a toggle linkage similar to that described in FIGS. 1 and 2 which is driven through the clevis arrangement 180 attached to the end of piston rod 176 which is reciprocated by the fluid cylinder drive 170.

The linkage system 133 also includes a steering link 142 having a means 143 for adjusting the length of the link 142. The link 142 is pivotally connected at one end at 144 to the carriage 128, and is pivotally connected at its other end at 146 to a link 137 fixed to and extending from the lever 136.

A second linkage system 150 is identical to that just described for the system 133 and includes a second lever 152, a second steering link 158 and a pivotal connection at 188 at the rearmost portion of lever 152 to the toggle linkage drive system.

The frame 140 includes a frame portion 190 which is journally mounted on a frame post 192. Again, the frame portion 190 may be suitably mounted on the frame post 192 so that upon rotation of the frame post 192 with the frame fixed thereon, or the rotation of the entire assembly around the post 192, the assembly can be removed from beneath a molten feeder to replace orifice rings when necessary.

Gear segments 196, 198 are fixedly secured to levers 136, 152 and are meshed with each other to synchronize the operation of levers 136, 152 and thus the two linkage systems to provide the coaction between the shearing carriages desired for proper severing of the row of gobs 12.

In operation the result obtained from the apparatus in FIG. 3 is substantially the same as that for the apparatus illustrated in FIGS. 1 and 2. That is, the movement of the levers 136, 152 toward and away from each other imparts an arcuate motion to the pivotal connections 134, 154. However, the corresponding rotation of steering links 142, 158 about their respective pivot points on the links 137 extending from the levers 136, 152, pivots the carriages 128, 130 as they move toward each other to translate the arcuate motion imparted by the levers 136, 152 into a substantially linear or straight line motion in the direction of each other.

The distinction between the apparatus illustrated in FIG. 3 and that discussed hereinbefore is that the fixed link 137 is secured to the levers 136, 152 rather than to the frame. Thus the link 137 pivots about the pivotal connection of the levers 136, 152 to the frame 140, thus moving the pivotal connection 146 of the steering link 142 in an arcuate path. This provides a compound motion for the steering links 142, 158 which may be compensated for by the selection of the proper lever and link lengths for each of the linkage systems to provide the linear gob shearing motion desired.

In the apparatus illustrated in FIG. 3 individual cutting blades 200 are utilized for the upper shearing means 124. Each blade 200 has a blade shaft 202 extending axially with respect to the motion of the blade, the shaft 202 being pivotally mounted at 204 on carrier 128. Connecting wings or ears 206 extend from each side of the shaft 202. Bolts 208, 210 on each side of the shaft extend through and into threaded openings in the wings 206. By loosening one of the bolts 208, 210 and tightening the other of the bolts 208, 210 the attitude of the blade 200 may be adjusted about its longitudinal axis.

Individual lower blades 220 are also utilized in the apparatus of FIG. 3. Each blade 220 has a blade shaft 222 extending transversely with respect to the direction of motion of the blade, the shaft 222 being pivotally supported at 224 on the carriage 130. Bolts 228 and 230 extend upwardly through the carriage 130 on opposite sides of the shaft 222 into threaded openings formed in the blade 220. By tightening one bolt and loosening the other bolt of the bolts 228, 230, the blade 220 may be pivoted about its transverse axis to permit adjustment and alignment with the upper blades 200.

Figure 4:
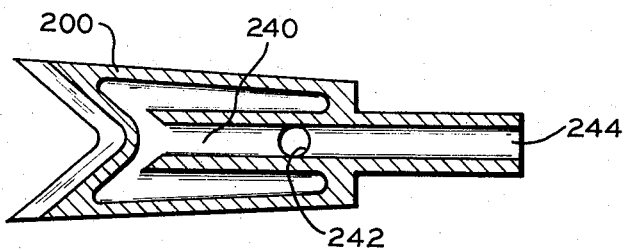
FIG. 4 is a cross-sectional view of one of the shear blades which may be utilized in this invention.

Referring to FIG. 4 there is illustrated a cross-sectional view of a blade suitable for use either in the upper or lower position in the apparatus of FIG. 3, and also suitable for use with the apparatus of FIG. 2. An upper blade 200 has been chosen for illustrating the principle involved and has internal passages 240 formed therein. Ports 242, 244 afford entry and exit ways for cooling fluids received from conduits 246, 248 illustrated in FIG. 3. The construction shown permits close temperature control of the shear blades while eliminating local pollution and possible contamination of the glass gobs in the forming area adjacent the glass shearing area.

As various changes may be made in the form, construction and arrangement of the parts, without departing from the spirit and scope of the invention and without sacrificing any of its advantages, it is to be understood that all matter herein is to be interpreted as illustrative and not in a limiting sense.

I claim:

1. Gob shearing apparatus for pivotally moving a shearing blade into and out of a gob shearing position, comprising
   (a) a shear carriage,
   (b) a support lever for said shear carriage having a first point pivotally connected to said shear carriage and pivotally supported at a second point remote from said first point,
   (c) drive means for moving said support lever about said second point to move said shear carriage into and out of a gob shearing position,
   (d) steering means pivotally connected to said shear carriage at a third point remote from said first point of support lever connection thereto for pivoting said shear carriage with respect to said support lever in response to movement by said support lever of said carriage to a gob shearing position to guide said carriage in an essentially linear path to a gob shearing position.

2. Apparatus as defined in claim 1 in which said steering means includes
   (a) a steering link having one end pivotally connected to said third point on said carriage, and
   (b) means for pivotally supporting the other end of said steering link a fixed distance from the pivotally supported second point on said support lever.

3. Apparatus as defined in claim 2 in which
   (a) the second point of said lever is pivotally supported by a frame structure, and in which
   (b) said means for pivotally supporting the other end of said steering link comprises an extension of said frame structure.

4. Apparatus as defined in claim 2 in which said means for pivotally supporting the other end of said steering link comprises a fixed link extending from said support lever.

5. Apparatus as defined in claim 2 in which
   (a) said support lever further includes a drive portion extending past the second point thereon and away from the first point of carriage support,
   (b) said drive means is a reciprocating drive means, and which further includes
   (c) a toggle linkage connecting said drive means and said drive portion of said support lever to increase shearing speed.

6. Apparatus as defined in claim 5 in which said drive means includes a fluid cylinder means having a reciprocable piston rod connected to said toggle linkage.

7. Apparatus as defined in claim 2 which further includes a plurality of shear blade cutting surfaces mounted on said carriage and positioned transverse to said linear movement path of said shear carriage enabling substantially simultaneous contact and shearing of a like plurality of gobs aligned in a row transverse to said linear path.

8. Apparatus as defined in claim 2 which further includes
   (a) a plurality of separate shear blades having a like plurality of shear blade cutting surfaces formed thereon,
   (b) each of said shear blades being pivotally mounted on said carriage on an axis transverse to its gob shearing movement, and
   (c) means for yieldingly biasing each pivoted blade toward shearing alignment with a cooperating and opposing blade cutting surface.

9. Apparatus as defined in claim 2 which further includes
   (a) shear blade means having cutting surfaces formed thereon and having internal passage means formed therein, and
   (b) means for connecting a cooling fluid to said blade means for circulation through said internal passage means.

10. Apparatus as defined in claim 2 which further includes
    (a) a frame structure for pivotally supporting the second point of said support lever,
    (b) a second shear carriage,
    (c) a second support lever pivotally connected to said second shear carriage at a fourth point and pivotally supported at a fifth point by said frame structure remote from said fourth point,
    (d) said drive means being connected to move said second support lever about said fifth point to move said second carriage into and out of a gob shearing position,
    (e) a second steering link having one end pivotally connected to a sixth point on said second shear carrriage remote from said fourth point of said second lever, and
    (f) means for pivotally supporting the other end of said second steering link a fixed distance from the fifth point of said second lever to steer said second shear carriage in a substantially linear second path in response to movement of said second lever, the second path registering with and opposed to the linear path of said first-mentioned carriage when said second lever is pivoting said second carriage to a gob contacting and shearing position.

11. Apparatus as defined in claim 10 in which said drive means includes
    (a) a gear segment connected to each support lever along the axis of the pivotal support of the lever,
    (b) said gear segments being meshed to synchronize movement of the support levers and coaction of the shearing carriages.

12. Gob shearing apparatus for a molten glass feeder, comprising
    (a) a pair of pivoted shear arms movable inwardly toward each other and outwardly away from each other between open and shearing positions,
    (b) a shear carriage pivotally mounted on each shear arm in opposed shearing relationship with respect to the shear carriage on the other shear arm, said shear carriage also having another pivotal connecting means, and (c) a guiding linkage for each shear carriage having a pivotal connection to said shear carriage at said other pivotal connecting means on said shear carriage, (d) each guiding linkage having a second pivotal connection remote from said shear carriage and located with respect to said shear carriage to be responsive to movement of said shear arm toward a shearing position to pivot the shear carriage on its shear arm to guide said shear carriage in an essentially linear path during the gob contacting and shearing portion of the inward movement of the carriage.

13. Apparatus as defined in claim 12 which further includes (a) a frame for supporting said shear arms, (b) each shear arm being pivotally supported on a fixed frame portion, (c) each said guiding linkage having its second pivotal connection supported on said fixed frame portion and spaced from the pivotal support of its associated shear arm.

14. Apparatus as defined in claim 12 which further includes (a) a frame for suporting said shear arms, (b) one of the pivotal connections not connected to the carriage of a shear arm-guide linkage combination being pivotally supported on a frame portion, (c) said one of said combination which is pivotally supported on said frame portion having a member extending toward the other of said combination to provide pivotal support therefor.

15. Apparatus for shearing a plurality of gobs aligned in a row and issuing from a molten glass feeder, comprising (a) a frame structure, (b) a pair of opposed shear carriages movable toward and away from each other between open and shearing positions with respect to a plurality of gobs, (c) a pair of opposing gob cutting surfaces for each gob to be severed mounted on said opposed shear carriages, (d) a lever for each shear carriage having one end pivotally connected to its carriage and a portion remote from the carriage end pivotally supported on said frame structure, each lever being operable to pivot its carriage toward and away from a gob shearing position, and (e) steering means connected to each of said shear carriages for pivoting said shear carriages on their levers in response to movement by said levers toward a gob shearing position to guide said carriages in essentially linear paths thereby enabling said opposing gob cutting surfaces to substantially simultaneously engage and sever the plurality of gobs.

References Cited

UNITED STATES PATENTS

| | | | |
|---|---|---|---|
| 1,879,690 | 9/1932 | Kadow et al. | 64—334 X |
| 1,898,407 | 2/1933 | Treece | 65—334 X |
| 1,994,123 | 3/1935 | Curtis, Jr. | 65—334 X |
| 1,390,448 | 9/1921 | La France | 65—334 X |
| 1,563,935 | 12/1925 | Steinhouse | 65—334 X |
| 2,680,937 | 6/1954 | Peiler | 65—334 X |
| 3,239,327 | 3/1966 | Stroup, Jr., et al. | 65—134 X |
| 3,264,077 | 8/1966 | Bishop | 65—133 X |
| 3,592,938 | 7/1971 | Bracken et al. | 65—133 X |
| 3,567,418 | 3/1971 | Hoette | 65—334 X |
| 3,435,719 | 4/1969 | Wythe. | |

FRANK W. MIGA, Primary Examiner

U.S. Cl. X.R.

65—133